(12) United States Patent
Burek et al.

(10) Patent No.: US 6,232,549 B1
(45) Date of Patent: May 15, 2001

(54) SPLICE CLOSURE GROUND LUG INSULATOR

(75) Inventors: Denis Edward Burek, Cumming; Marc Duane Jones, Lithonia; Kenneth Michael Yasinski, Ellenwood, all of GA (US)

(73) Assignee: Lucent Technologies Inc., Murray Hill, NY (US)

( * ) Notice: Subject to any disclaimer, the term of this patent is extended or adjusted under 35 U.S.C. 154(b) by 0 days.

(21) Appl. No.: 09/238,665

(22) Filed: Jan. 26, 1999

(51) Int. Cl.[7] ..................................................... H05K 5/03
(52) U.S. Cl. .............................. 174/51; 174/78; 174/80; 174/154; 174/163 R

(58) Field of Search ................................... 174/51, 60, 78, 174/80, 113 C, 135, 136, 148, 154–157, 158 R, 163 R, 165

(56) References Cited

U.S. PATENT DOCUMENTS 5,472,160  12/1995  Burek et al. ......................... 248/74.4

*Primary Examiner*—Dean A. Reichard
*Assistant Examiner*—Adolfo Nino
(74) *Attorney, Agent, or Firm*—Thomas, Kayden, Horstemeyer & Risley, LLP.

(57) ABSTRACT

A ground lug insulator assembly having a base member that mounts to a ground lug stud projecting from a splice closure. The base member is cup-shaped and houses a wire connector therein which is connected to the ground lug. A cup-shaped cap member is adapted to mate with the base member and to latch thereto after both are filled with B-sealant gel.

17 Claims, 8 Drawing Sheets

6,232,549 B1

SPLICE CLOSURE GROUND LUG INSULATOR

FIELD OF THE INVENTION

This invention relates to optical fiber cable splice closures and, more particularly, to a splice closure having a ground lug insulator assembly for a ground lug extending from inside the closure to the outside thereof.

BACKGROUND OF THE INVENTION

Signal transmission through optical fibers has become, or is becoming, the dominant signal transmission mode. The bandwidth characteristics of optical fibers, as well as their relative immunity to certain types of interference and contaminants make them the desirable transmission medium in high capacity trunk lines as well as in lower capacity feeder and distribution lines.

No matter what the intended end use may be, individual optical fibers generally are combined in an optical fiber cable which contains a plurality of such fibers, each of which is protected by at least one layer of coating material. In one configuration, the fibers are assembled into groups which are held together by binder ribbons or tubes to form a cable core. This is generally enclosed in a metallic or plastic tube or jacket which, in the latter case, often contains one or more strength members, typically of metal, such as heavy gauge wire. In another configuration, the fibers are arrayed in ribbon form and the core tube contains one or more stacked ribbons as well as strength members if desired.

Regardless of the cable configuration, it is usually necessary that the lengths of fiber cable be spliced at their ends to the ends of other cables, which entails splicing each of the individual fibers in a cable to a corresponding individual fiber in the second cable. To this end, there is provided a splice closure which usually comprises a protective case which contains at least one splice tray which, in turn, has a plurality of splice holders mounted thereon, into which the encased individual fiber splices are inserted and held. The cables are entrant into the case and generally are clamped to each end thereof to reduce the effects of tensile forces on the cables and on the splices. In U.S. patent application Ser. No. 08/847,214 of Burek et al., now U.S. Pat. No. 5,862,290, issued Jan. 19, 1999, there is shown an optical fiber cable splice closure, primarily for use outdoors.

Inasmuch as, at the splice point, the cable itself is opened up and the base fibers are exposed, the only protection afforded the fibers is provided by the closure, which can provide only one or two layers of protection from the outside environment, and the requirements therefor are more stringent than for the cable, which normally provides several layers of protection. The closure must anchor the cables stored therein, and it must be capable of withstanding torsional and axial loads transmitted by the cable to the closure so that the splices are protected from these loads. The closure must also seal the inner and outer sheaths of the cables and maintain the seal integrity under extreme environmental conditions. In addition, the closure must provide adequate fiber storage for slack fiber without damaging the fibers and without increasing signal attenuation. The closure preferably should be capable of storing any type of splice, such as, for example, discrete mechanical, discrete fusion or mass mechanical, or other types while reducing forces that tend to damage the splices. Additionally, the closure should provide adequate grounding and anchoring for the metallic strength members of the cable. The closure should also be capable of accepting high fiber count cables as well as those of low fiber count.

In order to insure protection of the splices from moisture, it is current practice to form the closure out of two mating halves, with a grommet therebetween, and clamp them together. Cable entry is through openings in the grommet, which are usually supplied with inserts which seal the cable and in turn are sealed by the grommet. Such a grommet and insert arrangement is shown, for example, in U.S. Pat. No. 5,472,160 of Burek, et al.

Cables entrant into the enclosure are preferably, and in present day usage, almost always anchored to the splice enclosure itself, to guarantee a minimum of movement of the cable within the enclosure which could unduly stress the fibers and the fiber splices. One such anchoring means, in the form of a cable grip block, is shown in the aforementioned Burek, et al. U.S. Pat. No. 5,472,160. The grip block of that patent is capable of adapting to cables of different sizes, and also provides an anchor for the cable central strength member which is a usual component of loose tube type cables. The anchoring arrangement for the cable strength member requires that the strength member or members be cut to a specific length and bent upward into a slot within the grip member. The strength members are maintained within the slots against tensile forces because of their rigidity and because they are bent at a right angle. Thus, they function to help maintain the cable against shifting or movement. The strength members, as pointed out hereinbefore, are preferably of metal and are typically grounded by connection to a ground bolt and lug which passes through a wall of the closure to the outside thereof. The lug, in turn, is connected to earth ground, and is sealed to the outside of the wall of the closure.

When the splice closure is used outdoors, for example, such as being suspended from overhead cables, or located in an outdoor closet, the external portion of the ground lug assembly, i.e., bolt plug lug, is subject to, and affected by, moisture, so that it may be grounded thereby. Normally, inasmuch as the lug is already connected to earth ground, the moisture effect is of no consequence, and the cable strength members within the closure are and remain connected to ground. It is sometimes the case, however, that the user, such as a local telephone company, for example, makes additional use of the strength members, where grounding of the members cannot be tolerated. For example, some users send electrical tone signals on the conductive strength members to check on cable condition by, for example, return loss measurement. Thus, the strength members function as the conductors in cable fault detection and location, and, if grounded, the process is disrupted. It is desirable, therefore, that, in a widely used splice closure, where the user so desires, there be some means for preventing grounding of the strength members so that they may function in the fault detection and location system, or in other possible systems.

SUMMARY OF THE INVENTION

The present invention is an apparatus for use with a standard splice closure, more particularly, for use with the ground lug of such a closure, that may be added to the exterior of the closure by the user where grounding of the ground lug is to be prevented. The ground lug comprises a threaded bolt or stud member which extends through an end wall of the closure lid, and which is bolted tightly thereto by means of, for example, hex nuts. O-rings between the nuts and the wall insure the moisture proof integrity of the interior of the closure. A connector lug is bolted in place upon the exterior portion of the threaded member, and typically, a wire is connected between the connector lug and earth ground.

The present invention, in a preferred embodiment thereof, comprises a cup-shaped insulator base of a non-conducting material such as a suitable plastic. The base has a rear wall with an opening therein shaped to fit snugly over the exterior hex shaped flange member of the closure ground lug, and first and second opposed latching arms extending from the side walls of the cup. The base is seated on an O-ring which fits onto the closure ground lug hex shaped flange member, and, in use, the base is held in place by means of a first washer which bears against the inside surface of the rear wall. A ninety degree bend connector bears against the other side of the first washer, and a second washer sandwiches the connector on the threaded portion of the ground lug within the interior of the cup-shaped base member. A nut is threaded onto the threaded portion of the ground lug and holds the second washer, the connector, the first washer and the base member firmly in place upon the ground lug while compressing the O-ring. A cup-shaped insulator cap of suitable insulating material and having first and second latching notches is adapted to be snapped onto and held by the latching arms of the insulator base. The cap has an extended nose portion having an end wall which has a bore therethrough, and a sealing and protective grommet fits within the bore. An insulated conductor wire extends through the grommet and into the cap and is affixed to the connector. The cup-shaped base and the cup-shaped cap are both filled with an insulating gel and the cap is snapped onto the base and latched thereto. Thus, the conducting wire, which may be, for example, solid #6 AWG ground wire, is electrically connected to the ground lug on the exterior of the closure and the electrical connection is fully protected from the effects of ambient moisture The wire can then be connected to relevant circuitry, thereby permitting the use of the strength members as part of the fault detection and location circuitry.

The entire process of mounting the ground lug insulator to the ground lug of a closure requires a minimum amount of time and can be readily accomplished in the field or on site. Removing the ground lug insulator when desired is just as readily accomplished.

The numerous features and advantages of the present invention will be more readily apparent from the following detailed description, read in conjunction with the accompanying drawings.

DETAILED DESCRIPTION

Figure 1:
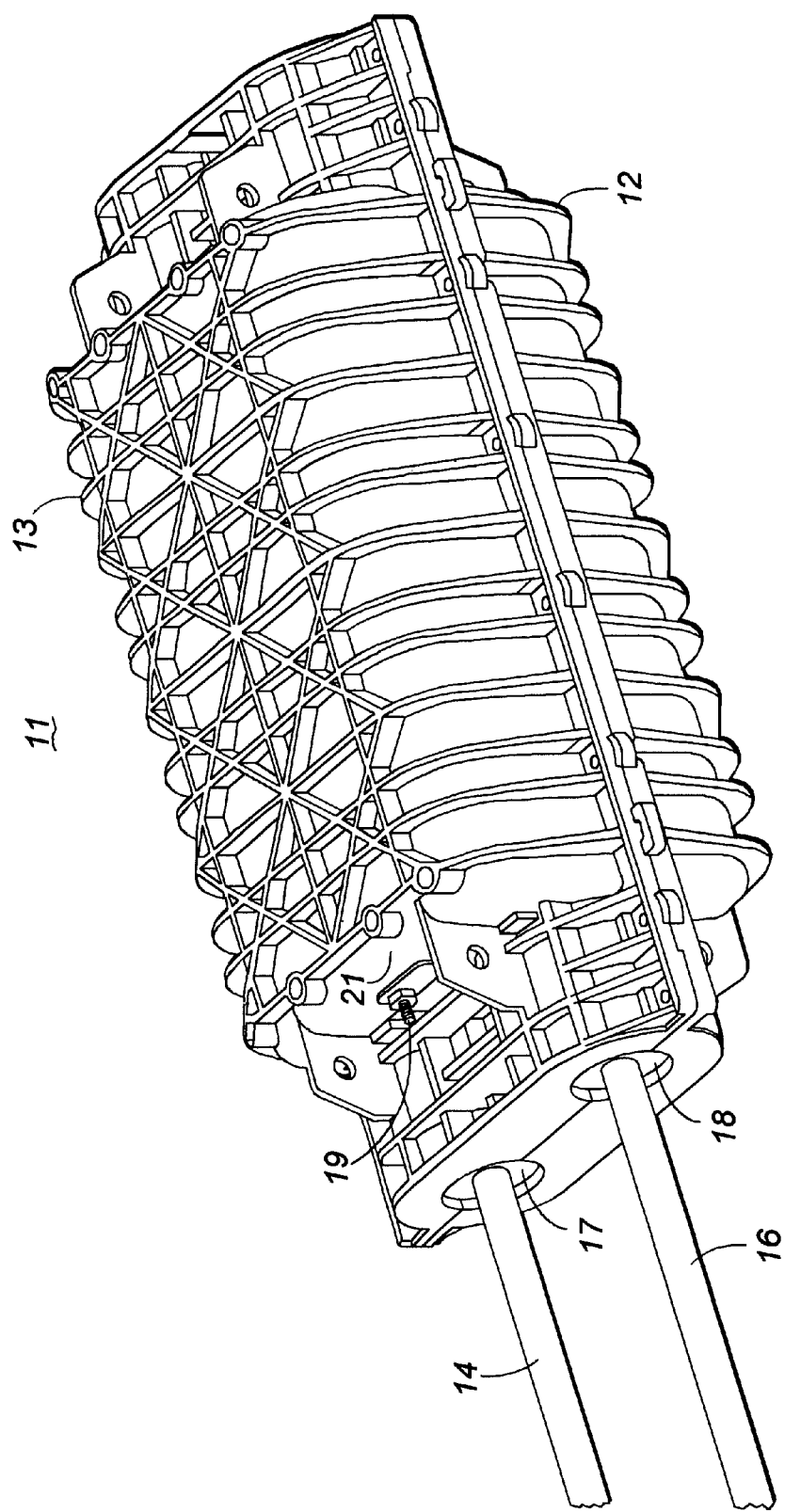
FIG. 1 is a perspective view of a splice closure having a ground lug assembly passing through a wall thereof.

In FIG. 1 there is shown an assembled splice case 11 of the type shown in the aforementioned Burek et al. U.S. Pat. No. 5,862,290, having a cover member 12 and a base member 13 joined together with a racetrack grommet (not shown) sandwiched therebetween (the splice case is shown upside down). First and second cables 14 and 16, which, for purposes of this discussion, have conductive strength members (not shown) therein, are entrant into (or exiting from) the closure 11 through grommet inserts 17 and 18 in the manner taught in the aforementioned Burek et al. U.S. Pat. No. 5,862,290. As discussed hereinbefore, the strength members are anchored within the closure 11 and connected, as by conductive straps (not shown) to a ground lug assembly 19 within the closure 11. As will be discussed in detail hereinafter, the ground lug assembly 19 passes through a wall of the closure 11, e.g., a wall 21 of the base member 13 and is sealed thereto to prevent the ingress of moisture.

Figure 2:
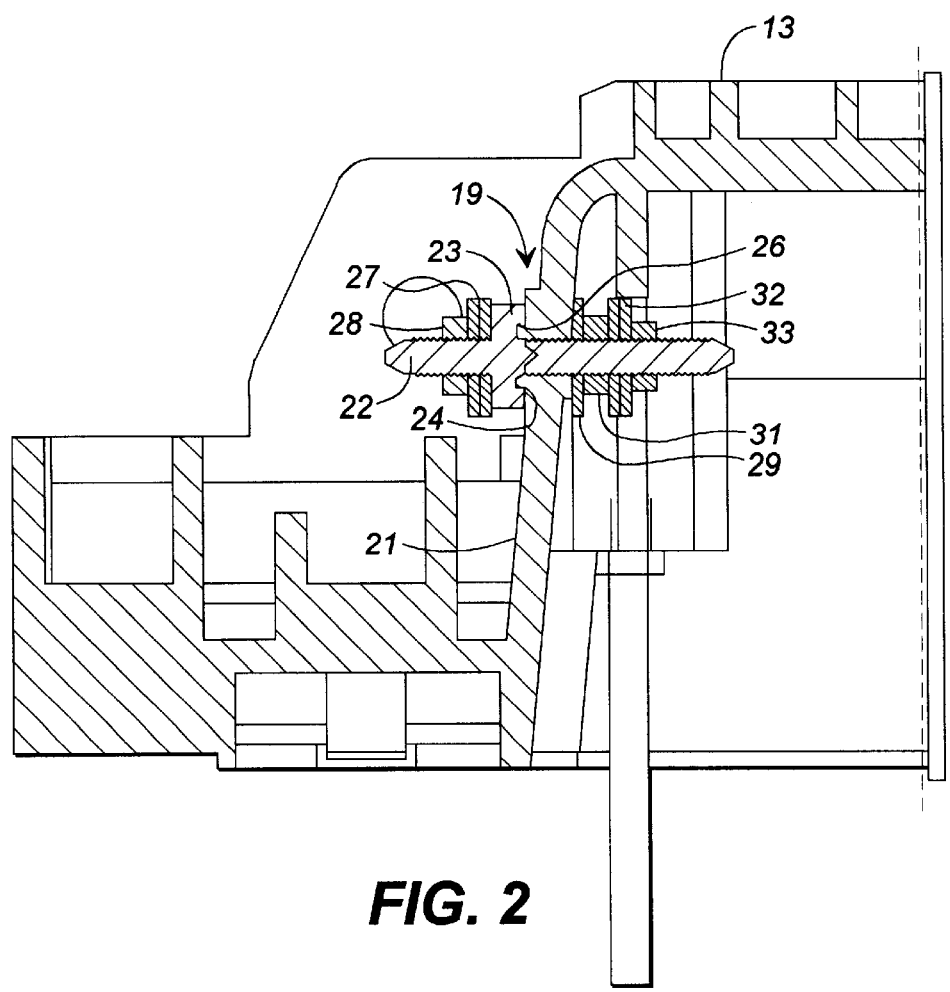
FIG. 2 is a cross-sectional detail view of the ground lug assembly as mounted in the splice closure.

FIG. 2 is a cross-sectional detail view of the ground lug assembly 19, which comprises a double threaded end bolt or stud 22 having a hex shaped flange member 23 between its ends. The face 24 of flange member 23 that abuts the exterior surface of wall 21 has an O-ring raceway thereon which supports a sealing O-ring 26 which bears against wall 21, and, when the assembly 19 is mounted in place, provide a moisture proof seal to prevent moisture from entering the splice closure 11. A pair of washers 27 and a nut 28, such as a hex nut, serve as mounting means in conjunction with washer 29 and nut 31. If desired, an O-ring or other sealing means (not shown) may be located between washer 29 and the interior surface of wall 21. Washers 32 and nut 33 are supplied for connecting the strength members to the ground lug assembly 19. When nuts 28 and 31 are tightened, lug assembly 19 is secured to wall 21 of base 13 in a sealed mount that effectively blocks moisture from entering the splice closure 11. Although only one ground lug assembly is shown, there may be two, in side by side arrangement, as can be inferred from FIG. 1, or in other desired arrangements.

Figure 3:
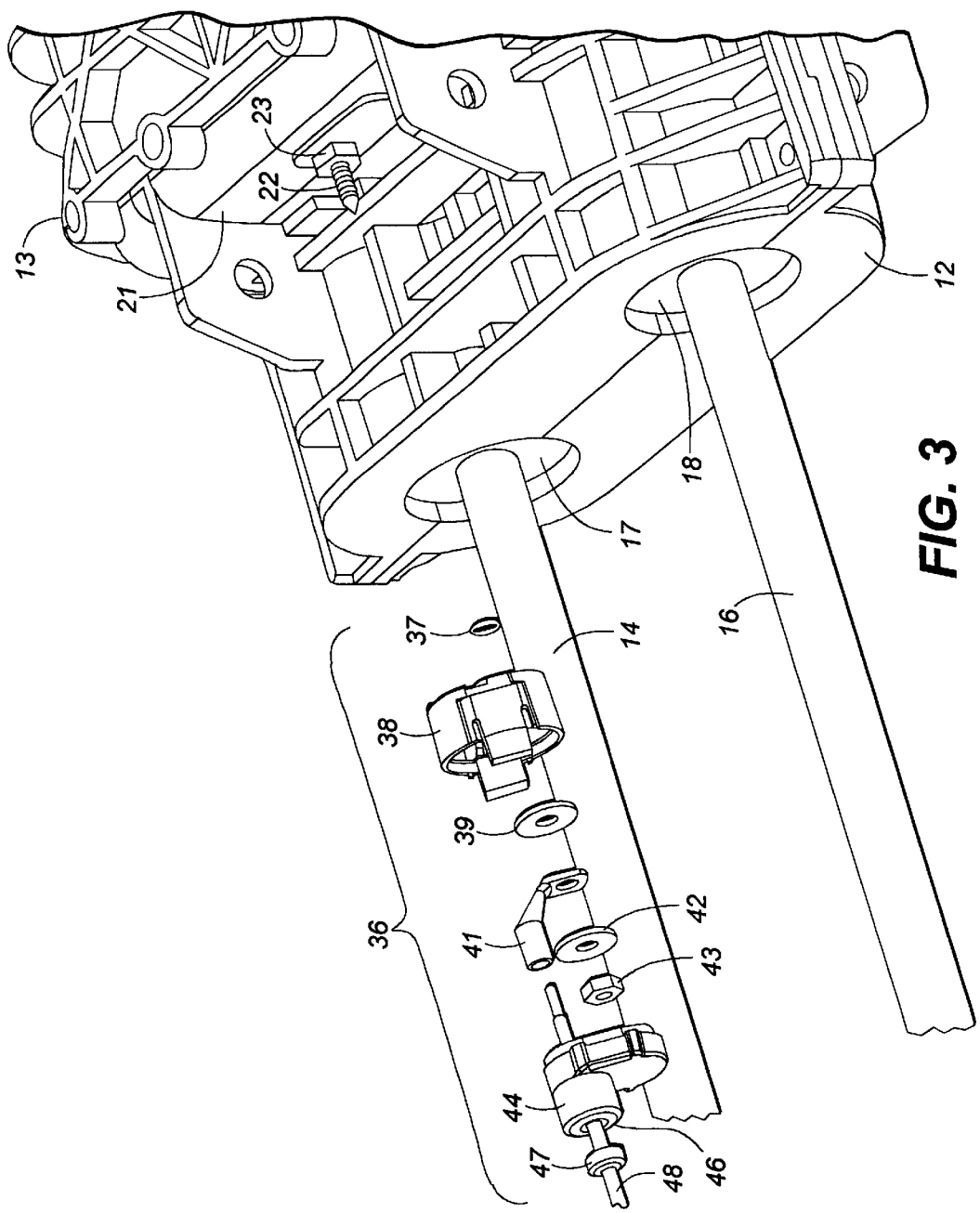
FIG. 3 is perspective, exploded view of the ground lug insulator of the invention.

FIG. 3 is an exploded view of the ground lug insulator assembly 36 of the present invention for use with the closure 11 and ground lug assembly 19. It is to be understood that the insulator assembly 36 of the invention is readily usable with, or easily adapted for use with, other ground lug arrangements and other splice closures.

The assembly 36 comprises an O-ring 37 which fits over the hex shaped flange member 23 of the ground lug 19, and, as will be more apparent hereinafter, fits into a raceway on the rear wall of a cup-shaped base member 38 which has an opening in the rear wall 40 shown in FIG. 4b, for example, which is shaped to fit snugly over the nut 23. Member 38 is made of a suitable insulating material such as a rigid plastic. A washer 39 fits over the stud 22 and bears against the interior side of the rear wall 40. A connector 41 having a ninety degree bend fits over stud 22 and is held in place by a washer 42 and a nut 43 threaded to fit upon stud 22. When nut 43 is tightened down, base member 38 is forced against the O-ring 37 and forms a moisture seal therewith. In addition, connector 41 is fixed in place within member 38. A cup-shaped insulator cap 44 of suitable insulating material is, as will be explained more fully hereinafter, adapted to be snapped into latching engagement with base member 38 to form a hollow enclosure. Cap member 44 has a bore or opening 46 into which is fitted a grommet 47. Grommet 47 has an opening therein sized to fit snugly over an insulated connector or ground wire 48 which, in practice, extends through opening 46 to connector 41, to which it is attached and conductively connected by suitable means, such as solder or crimping.

In use, the hollow interiors of both base member 38 and cap member 44 are, after wire 48 has been connected to connector 41, filled with a suitable insulating material, such as B-Sealant gel which is widely used in the industry as an insulating material.

Figure 4A:
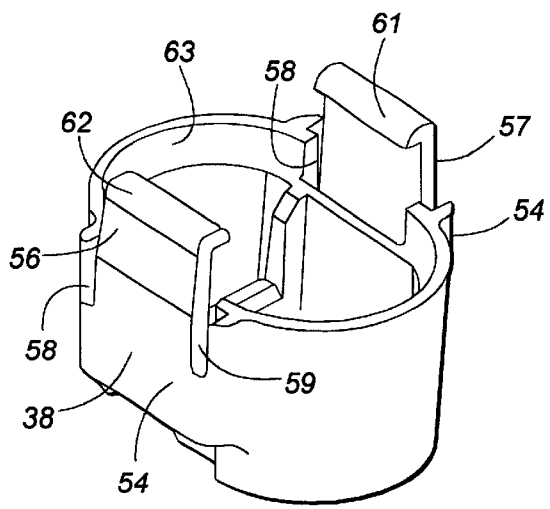
FIGS. 4a through 4f are several views of the base member of the insulator of the invention.
Figure 4B:
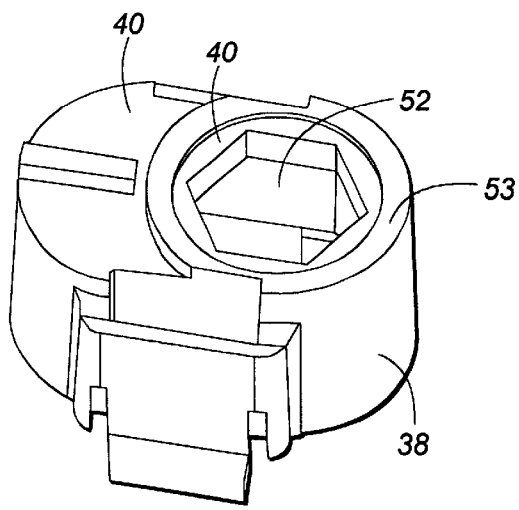
Figure 4C:
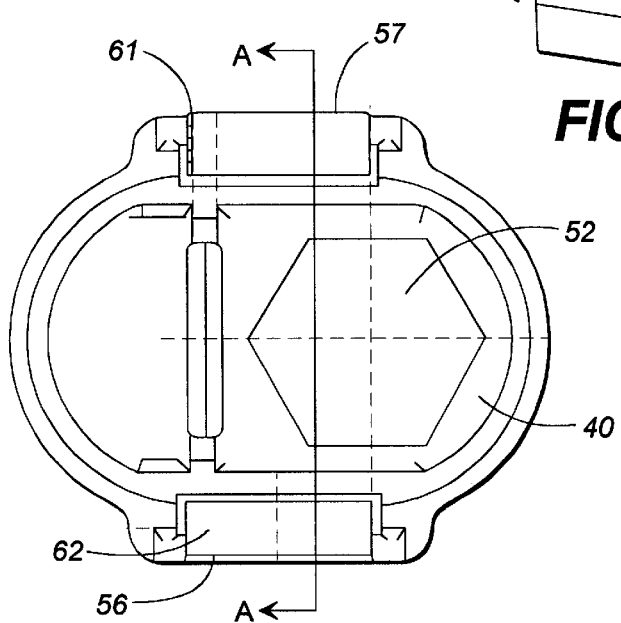
Figure 4D:
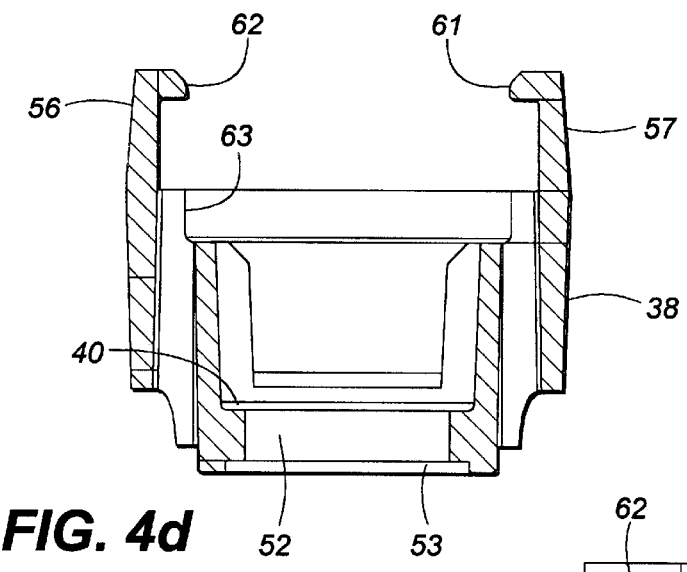
Figure 4E:
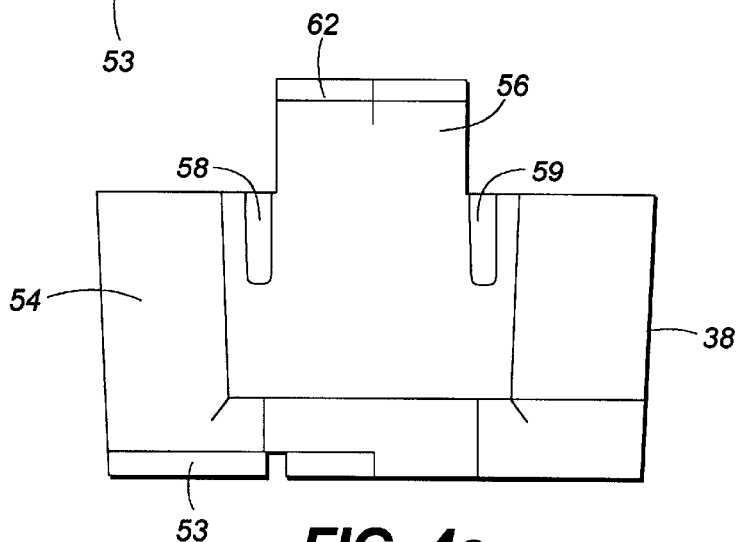
Figure 4F:
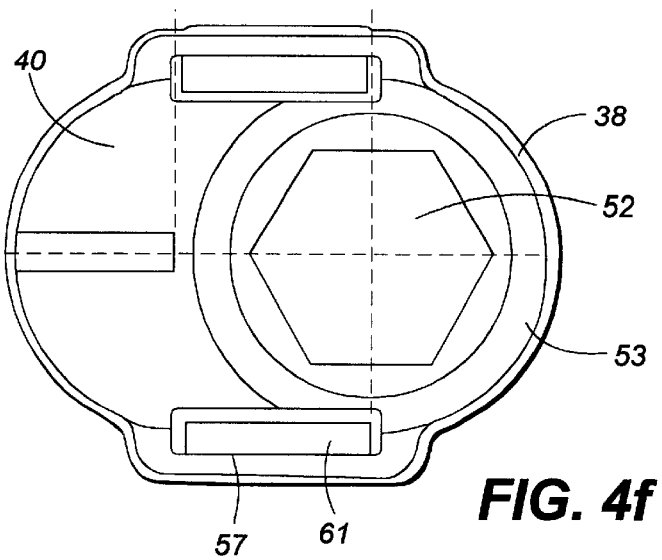

FIGS. 4a and 4b are different perspective views of the cup shaped base members 38 of FIG. 3. Member 38, which preferably is made of a suitable insulating material such as a rigid, hard plastic, has a rear wall 40 which has an opening 52 therein shaped and sized to fit snugly over hex shaped flange member 23 of the ground lug assembly. In 4b, it can be seen that the opening 52 has six sides to permit it to conform to hex shaped flange member 23. If, instead of a hex shape, item 23 were some other shape, hole or opening 52 would preferably have that shape. On the exterior surface of the rear wall 40 is an O-ring raceway 53 which surrounds opening 52 and accommodates or is adapted to contain O-ring 37. Base member 38 has side walls 54 from which extends latching arms 56 and 57. To insure the resiliency of arms 56 and 57, wall 44 has slits 58 and 59 on either side of each arm 56 and 57. Additionally, the distal ends of arms 56 and 57 have latching protrusions 61 and 62 which are best seen in FIG. 4d, which is a cross-sectional view along the line A—A of FIG. 4c. Side wall 54 has, at its open end, an internally recessed portion 63 extending around its periphery for receiving an extending portion 64 of cup shaped insulator cap 44, in a substantial slip fit, shown in the several views 5a through 5g.

Figure 5A:
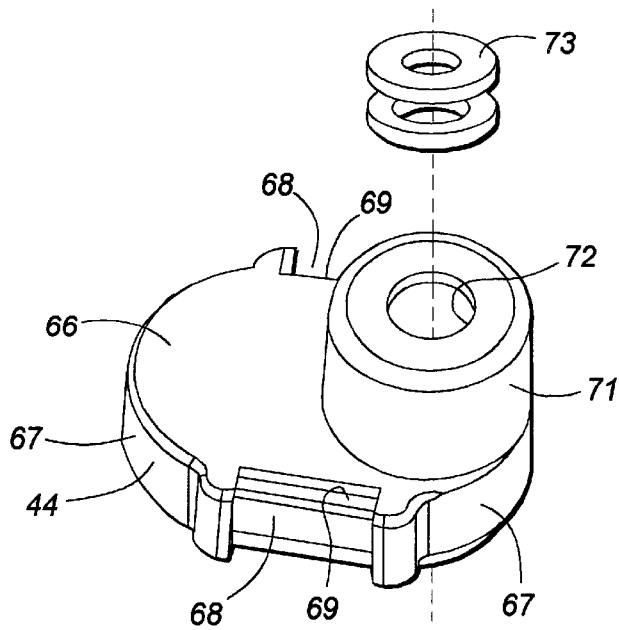
FIGS. 5a through 5g are several views of the cap member of the insulator of the invention.
Figure 5B:
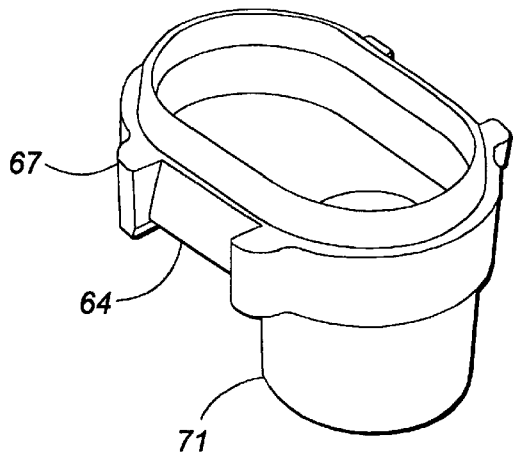
Figure 5C:
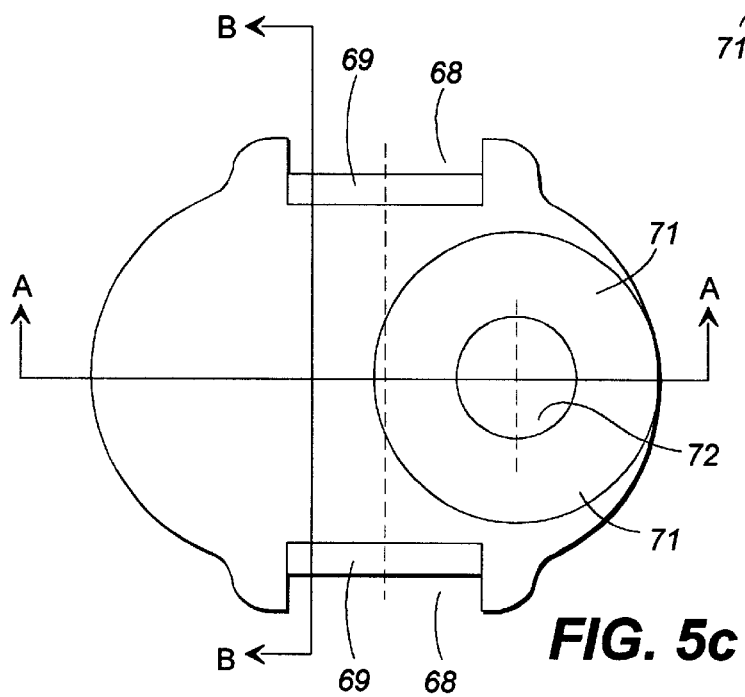
Figure 5D:
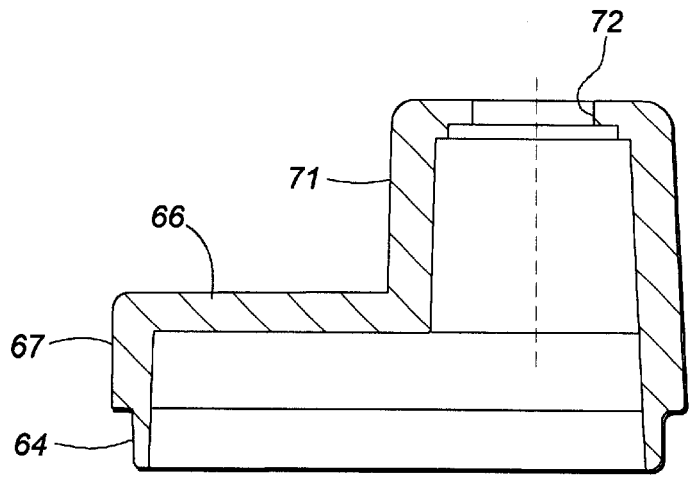
Figure 5E:
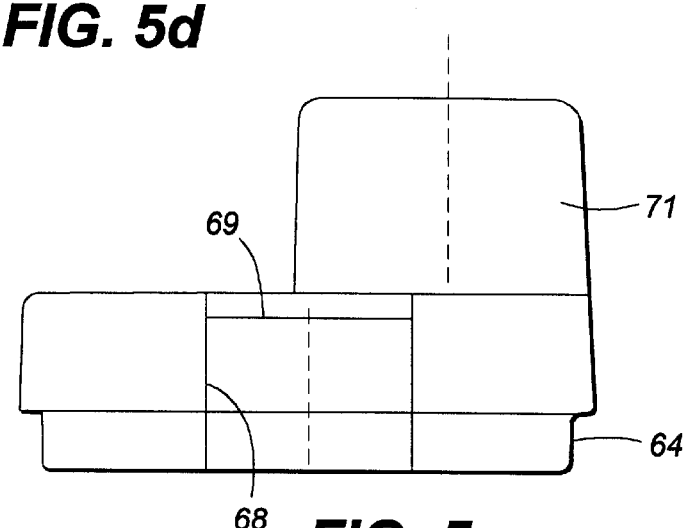
Figure 5F:
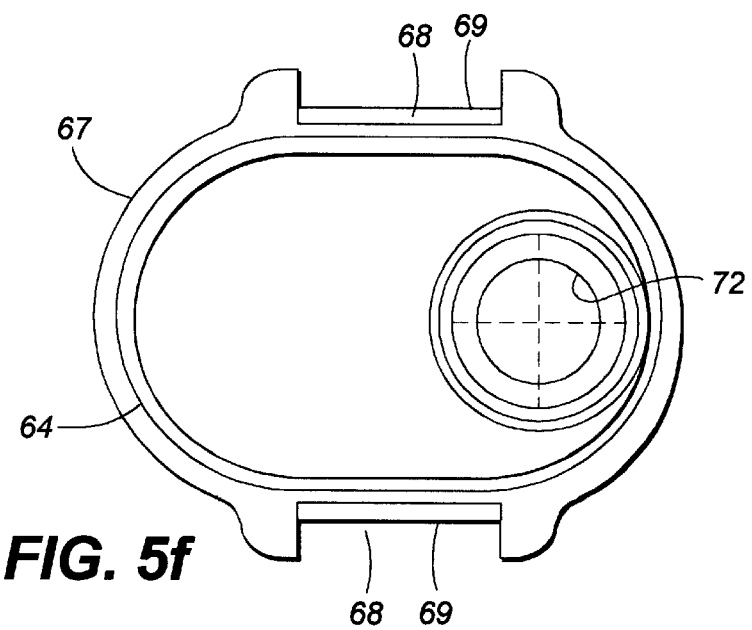
Figure 5G:
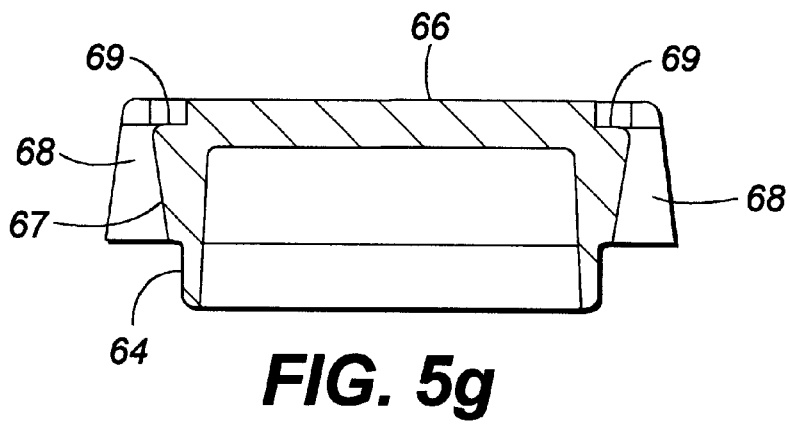

FIGS. 5a and 5b are perspective views of the insulator cap 44 which has a substantially flat wall member 66 from which depends a side wall 67. Side wall 67 has an extension 64 depending therefrom which is sized and shaped to be a slip fit into recess portion 63 in member 38. Side wall 67 is interrupted by two latching notches 68 which have latching surfaces 69 therein for latching engagement with protrusions 61 and 62 on arms 57 and 56 of base member 38. Extending from wall 66 in the direction opposite to extension 64 is a nose portion 71 which has a bore or hole 72 therein, as best seen in FIG. 5d, a sectional view along the line A—A of FIG. 5c. Bore 72 is sized, along with a grommet 73 insertable therein, to receive and hold connector wire 48 which may be, for example #6 AWG solid wire. Wire 48 may be connected to appropriate circuitry when, for example, the cable strength members are used as test circuit elements, or it may be connected to ground.

The procedure for assembling and mounting the ground lug insulator of the invention is as follows:

Wire 48 is stripped and dressed for approximately one-half inch.

Coat the end of the insulation, not the bare wire on wire 48 with B-Sealant gel and insert the wire through grommet 73 and insulator cap 44 and crimp the bare end to connector 41.

Figure 6:
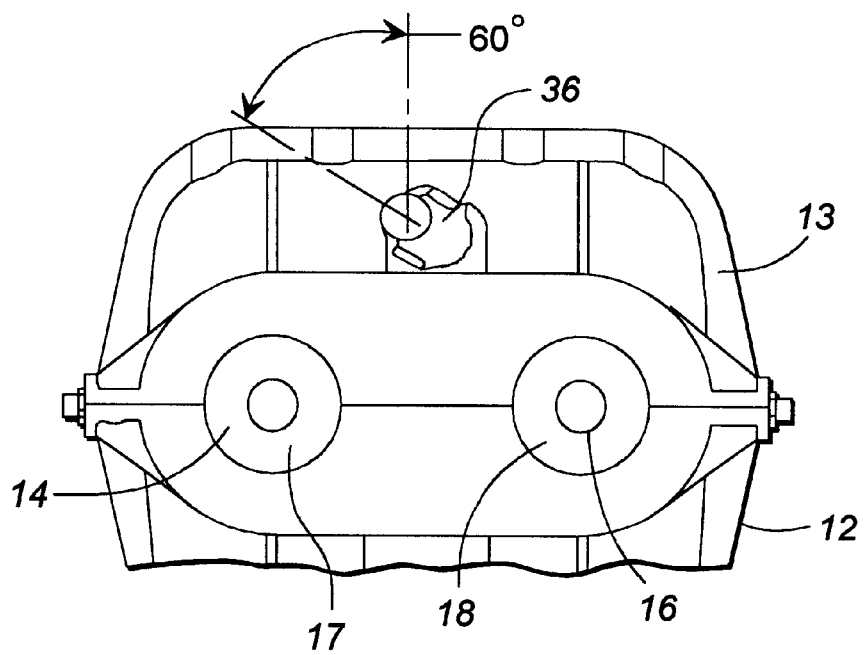
FIG. 6 is an end view of the splice closure with the lug insulator in one position thereon.

Place O-ring 37 over hex shaped flange member 23 and place base member 38 over the hex shaped flange member 23 with, preferably, the orientation shown in FIG. 6. The orientation shown is one that allows an adjacent ground lug insulator to be placed adjacent thereto, however, other orientations may be used, if desired. O-ring 37 should seal in raceway 53.

Place the washer 39, connector 41, and washer 42 onto stud 22 and tighten down with nut 43. The nut is tightened to approximately 60 in-lbs. (6.78 Nm). Fill the insulator base 38 with B-sealant gel, slide the cap 44 down the wire into close proximity to the base member and fill it with B-Sealant gel, then snap cap 44 onto base 38 until projections 61 and 62 on arms 57 and 56 mate with and latch to surfaces 69 on cap 44.

From the foregoing, it can be seen that the ground lug insulator of the invention is readily adaptable to existing splice closure and can be mounted quickly and easily thereto.

In concluding the detailed description, it should be noted that it will be obvious to those skilled in the art that many variations and modifications may be made to the preferred embodiment without substantial departure from the spirit and scope of the principles of the present invention. All such variations and modifications are intended to be included herein as being within the scope of the present invention as set forth in the following claims. Further, in the claims hereafter, the corresponding structures, materials, acts and equivalents of all means or step plus function elements are intended to include any structure, material or acts for performing the functions with other elements as specifically claimed.

What is claimed is:

1. For use with a closure member having walls forming an interior, and a ground lug assembly mounted in one of the walls and passing therethrough and having a portion extending externally therefrom, a ground lug assembly insulator assembly comprising:

a cup-shaped base member of non-conducting material for surrounding the externally extending portion of the ground lug assembly; and a cup-shaped cap member adapted to mate with said base member to create a hollow enclosure;

said cap member having a bore therein for permitting passage of a connecting wire member therethrough into said hollow enclosure for connection to the ground lug assembly.

2. A ground lug insulator assembly as claimed in claim 1 wherein said base member has a wall having an opening therein for passage of the externally extending portion of the ground lug assembly into said hollow enclosure, and a sealing member for sealing said opening in said base member wall relative to said ground lug assembly.

3. A ground lug insulator assembly as claimed in claim 2 wherein said sealing member is an O-ring adapted to surround said opening in said base member wall.

4. A ground lug insulating assembly as claimed in claim 3 wherein said base member wall has, on the exterior thereof, a raceway for containing said O-ring.

5. A ground lug insulator assembly as claimed in claim 1 and further including a mounting member for mounting said base member to the ground lug assembly.

6. A ground lug insulator assembly as claimed in claim 1 and further including insulating material for containment within said hollow enclosure.

7. A ground lug insulator assembly as claimed in claim 6 wherein said insulating material is B-sealant gel.

8. A ground lug insulator assembly as claimed in claim 1 and further including a connecting lug for mounting on the externally extending portion insulator assembly within said hollow enclosure for connection to the connecting wire.

9. A ground lug insulator assembly as claimed in claim 1 wherein said cup shaped base member has first and second latching arms and said cup shaped cap member has first and second surfaces for mating with said latching arms.

10. A ground lug insulator assembly as claimed in claim 9 wherein said cup-shaped base member has a side wall having a recessed portion extending around its periphery.

11. A ground lug insulator assembly as claimed in claim 10 wherein said cup-shaped cap member has a side wall having an extending portion shaped to fit within said recessed portion of said base member.

12. A ground lug insulator assembly as claimed in claim 11 wherein said cup-shaped cap member is made of a non-conducting material.

13. A ground lug insulator assembly for mounting to an externally threaded member, extending from a wall, said assembly comprising:

a cup-shaped base member having a wall with an opening therein for fitting said base member over the externally threaded member;

a threaded member for attaching said base member to the externally threaded member, said base member having latching means thereon;

a resilient member for surrounding the threaded member and sealing said base member to the wall from which the externally threaded member extends;

a cup-shaped cap member having latching means thereon for mating with the latching means on said base member to form a hollow enclosure surrounding the externally threaded member, said enclosure being filled with an insulating material;

connector means within said enclosure and connected to the externally threaded member; and said cap member having an opening therein for passage of a connector wire to said connector means.

14. A ground lug insulator assembly as claimed in claim 13 wherein said resilient member is an O-ring.

15. A ground lug insulator assembly as claimed in claim 13 wherein said insulating material is B-sealant gel.

16. A ground lug insulator assembly as claimed in claim 13 wherein said cup-shaped base member is made of non-conducting material.

17. A ground lug insulator assembly as claimed in claim 13 wherein said cup-shaped cap member is made of non-conducting material.

* * * * *